US012803003B2

(12) United States Patent
Moriya et al.

(10) Patent No.: US 12,803,003 B2
(45) Date of Patent: Nov. 17, 2026

(54) NON-AQUEOUS ELECTROLYTE SECONDARY BATTERY

(71) Applicant: Panasonic Energy Co., Ltd., Moriguchi (JP)

(72) Inventors: Shigeki Moriya, Osaka (JP); Yasunobu Iwami, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 732 days.

(21) Appl. No.: 18/267,323

(22) PCT Filed: Dec. 17, 2021

(86) PCT No.: PCT/JP2021/046815
§ 371 (c)(1),
(2) Date: Jun. 14, 2023

(87) PCT Pub. No.: WO2022/138503
PCT Pub. Date: Jun. 30, 2022

(65) Prior Publication Data

US 2024/0014403 A1 Jan. 11, 2024

(30) Foreign Application Priority Data

Dec. 23, 2020 (JP) ................................ 2020-213438

(51) Int. Cl.
*H01M 4/66* (2006.01)
*H01M 4/62* (2006.01)
(Continued)

(52) U.S. Cl.
CPC ........... *H01M 4/663* (2013.01); *H01M 4/625* (2013.01); *H01M 10/0431* (2013.01); *H01M 10/0587* (2013.01); *H01M 50/538* (2021.01)

(58) Field of Classification Search
CPC ............. H01M 4/625; H01M 10/0587; H01M 10/0431; H01M 50/538
See application file for complete search history.

(56) References Cited

U.S. PATENT DOCUMENTS

2002/0055047 A1 5/2002 Satoh et al.
2012/0171566 A1 7/2012 Yoshitake et al.
(Continued)

FOREIGN PATENT DOCUMENTS

JP 2002-093406 A 3/2002
JP 2002-329529 A 11/2002
(Continued)

OTHER PUBLICATIONS

International Search Report dated Mar. 1, 2022, issued in counterpart International Application No. PCT/JP2021/046815 (4 pages).
(Continued)

*Primary Examiner* — Jeremiah R Smith
(74) *Attorney, Agent, or Firm* — WHDA, LLP

(57) ABSTRACT

A non-aqueous electrolyte secondary battery according to an aspect of the present disclosure comprises: an electrode body obtained by winding a positive electrode and a negative electrode with a separator therebetween; an electrolytic solution; and an exterior body that houses the electrode body and the electrolytic solution. The negative electrode has: a negative electrode current collector; and a negative electrode mixture layer formed on the surface of the negative electrode current collector, wherein the negative electrode mixture layer contains a negative electrode active material and fibrous carbon, and the average fiber length of the fibrous carbon contained in the central part of the negative electrode mixture layer in the width direction is greater than the
(Continued)

average fiber length of the fibrous carbon contained in both end parts of the negative electrode mixture layer in the width direction.

5 Claims, 2 Drawing Sheets

(51) Int. Cl.

| | |
|---|---|
| ***H01M 10/04*** | (2006.01) |
| ***H01M 10/0587*** | (2010.01) |
| *H01M 50/538* | (2021.01) |

(56) References Cited

U.S. PATENT DOCUMENTS

| | | | | |
|---|---|---|---|---|
| 2015/0162610 | A1* | 6/2015 | Zaghib | H01M 4/366<br>429/224 |
| 2015/0372309 | A1* | 12/2015 | Yachi | H01M 4/625<br>429/232 |
| 2018/0138511 | A1* | 5/2018 | Munaoka | H01M 4/625 |
| 2020/0083560 | A1* | 3/2020 | Harutyunyan | H01M 10/0431 |
| 2021/0193991 | A1* | 6/2021 | Fukumoto | H01M 50/103 |
| 2021/0313559 | A1* | 10/2021 | Zettsu | H01M 4/625 |
| 2022/0037661 | A1 | 2/2022 | Moriya et al. | |
| 2023/0343922 | A1* | 10/2023 | Kishimoto | H01M 4/139 |

FOREIGN PATENT DOCUMENTS

| | | | |
|---|---|---|---|
| JP | 2010-238575 | A | 10/2010 |
| JP | 2020-136045 | A | 8/2020 |
| WO | 2006/019148 | A1 | 2/2006 |
| WO | 2020/175172 | A1 | 9/2020 |

OTHER PUBLICATIONS

Office Action dated Aug. 19, 2025, issued in counterpart JP Application No. 2022-571408.(4 pages).

* cited by examiner

NON-AQUEOUS ELECTROLYTE SECONDARY BATTERY

CROSS REFERENCE TO RELATED APPLICATIONS

This Application is the National Stage of International Application No. PCT/JP2021/046815, filed on Dec. 17, 2021, which claims priority from Application No. 2020-213438 filed on Dec. 23, 2020 in Japan. The entire contents of these applications are incorporated herein by reference in their entirety.

TECHNICAL FIELD

The present disclosure generally relates to a non-aqueous electrolyte secondary battery, and more particularly to a non-aqueous electrolyte secondary battery in which a negative electrode includes fibrous carbon.

BACKGROUND ART

A positive electrode and negative electrode of a non-aqueous electrolyte secondary battery have a metal being a current collector and a mixture layer formed on a surface of the current collector. The mixture layer may be formed by applying a mixture slurry containing an active material and a conductive agent on the surface of the current collector, and drying and compressing the coating. To improve battery performance, fibrous carbon such as carbon nanotube may be used as the conductive agent. For example, Patent Literature 1 discloses the technique of uniformly dispersing the fibrous carbon in the mixture slurry by using two kinds of the fibrous carbon having different diameter sizes.

CITATION LIST

Patent Literature

PATENT LITERATURE 1: Japanese Unexamined Patent Application Publication No. 2010-238575

SUMMARY

Technical Problem

In a non-aqueous electrolyte secondary battery having a wound electrode assembly, expansion and contraction of the electrode assembly associated with charge and discharge may cause ununiformed distribution of an electrolyte liquid in the electrode assembly, and a battery capacity may be deteriorated by repeated charge and discharge. The technique disclosed in Patent Literature 1 does not investigate the distribution of the electrolyte liquid in the electrode assembly, and still has a room for improvement of the charge-discharge cycle characteristics.

It is an object of the present disclosure to provide a non-aqueous electrolyte secondary battery having improved charge-discharge cycle characteristics.

Solution to Problem

A non-aqueous electrolyte secondary battery of an aspect of the present disclosure comprises: an electrode assembly in which a band-shaped positive electrode and a band-shaped negative electrode are wound with a separator interposed therebetween; an electrolyte liquid; and an exterior housing the electrode assembly and the electrolyte liquid. The negative electrode has a negative electrode current collector and a negative electrode mixture layer formed on a surface of the negative electrode current collector, the negative electrode mixture layer contains a negative electrode active material and fibrous carbon, and an average fiber length of the fibrous carbon contained in a middle portion in a width direction of the negative electrode mixture layer is larger than an average fiber length of the fibrous carbon contained in both edge portions in the width direction of the negative electrode mixture layer.

Advantageous Effect of Invention

According to the secondary battery of an aspect of the present disclosure, the charge-discharge cycle characteristics may be improved.

DESCRIPTION OF EMBODIMENTS

Hereinafter, an example of an embodiment of a cylindrical secondary battery according to the present disclosure will be described in detail with reference to the drawings. In the following description, specific shapes, materials, values, directions, and the like, which are examples for facilitating understanding of the present invention, may be appropriately modified with specifications of cylindrical secondary batteries. When a plurality of embodiments and modified examples are included in the following description, use in appropriate combination of characteristic portions thereof is anticipated in advance.

Figure 1:
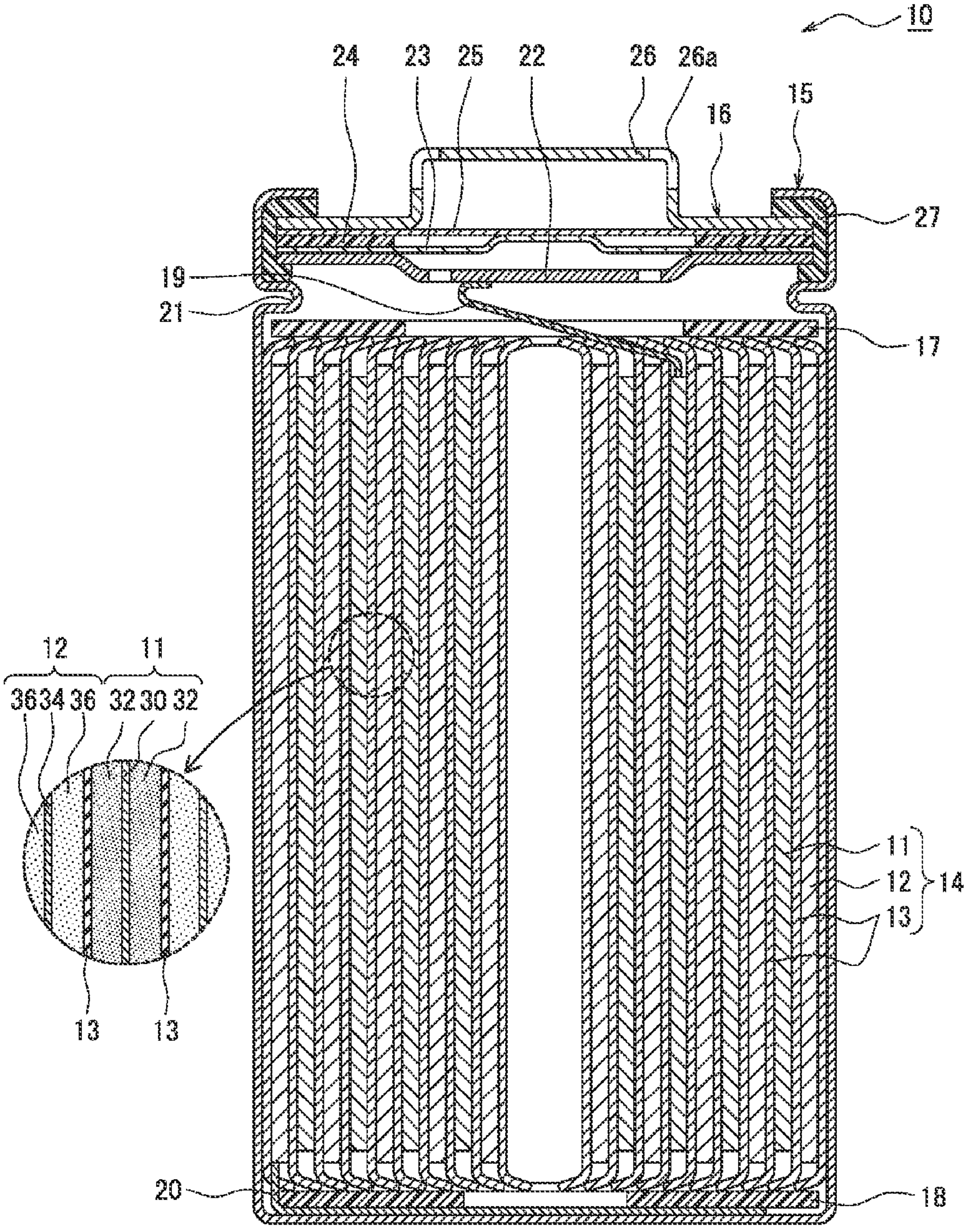
FIG. 1 is an axial sectional view of a cylindrical secondary battery of an example of an embodiment.

FIG. 1 is an axial sectional view of a cylindrical secondary battery 10 of an example of an embodiment. In the secondary battery 10 illustrated in FIG. 1, an electrode assembly 14 and an electrolyte liquid (not illustrated) are housed in an exterior 15. The electrode assembly 14 has a wound structure in which a band-shaped positive electrode 11 and a band-shaped negative electrode 12 are wound with a separator 13 interposed therebetween. Hereinafter, for convenience of description, a sealing assembly 16 side will be described as the "upper side", and the bottom side of the exterior 15 will be described as the "lower side".

An opening end of the upper part of the exterior 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and is welded to the lower face of a filter 22, which is a bottom plate of the sealing assembly 16. In the secondary battery 10, a cap 26, which is a top plate of the sealing assembly 16 electrically connected to the filter 22, becomes a positive electrode terminal. On the other hand, a negative electrode lead 20 extends through an outside of the insulating plate 18 toward the bottom side of the exterior 15, and is welded to a bottom inner face of the exterior 15. In the secondary battery 10, the exterior 15 becomes a negative electrode terminal.

The exterior 15 is, for example, a bottomed cylindrical metallic exterior housing can. A gasket 27 is provided between the exterior 15 and the sealing assembly 16 to achieve sealability inside the secondary battery 10. The exterior 15 has a grooved portion 21 formed by, for example, pressing the side wall thereof from the outside to support the sealing assembly 16. The grooved portion 21 is preferably formed in a circular shape along a circumferential direction of the exterior 15, and supports the sealing assembly 16 with the gasket 27 interposed therebetween and with the upper face of the grooved portion 21.

The sealing assembly 16 has the filter 22, a lower vent member 23, an insulating member 24, an upper vent member 25, and the cap 26 that are stacked in this order from the electrode assembly 14 side. Each member constituting the sealing assembly 16 has, for example, a disk shape or a ring shape, and each member except for the insulating member 24 is electrically connected to each other. The lower vent member 23 and the upper vent member 25 are connected to each other at each of middle portions thereof, and the insulating member 24 is interposed between circumferences thereof. If the internal pressure of the battery increases due to abnormal heat generation, for example, the lower vent member 23 breaks and thereby the upper vent member 25 expands toward the cap 26 side to be separated from the lower vent member 23, resulting in cutting off of an electrical connection between both members. If the internal pressure further increases, the upper vent member 25 breaks, and gas is discharged through an opening **26*a* of the cap 26**.

Hereinafter, the positive electrode 11, the negative electrode 12, the separator 13, and the electrolyte liquid, which constitute the secondary battery 10, particularly a negative electrode active material included in a negative electrode mixture layer constituting the negative electrode 12 will be described in detail.

[Positive Electrode]

The positive electrode 11 has, for example, a band-shaped positive electrode current collector and a positive electrode mixture layer formed on a surface of the positive electrode current collector. As illustrated in FIG. 1, the positive electrode 11 may have positive electrode mixture layers 32 on both the surfaces of a positive electrode current collector 30. As the positive electrode current collector 30, a foil of a metal stable within a potential range of the positive electrode 11, such as aluminum, a film in which such a metal is disposed on a surface layer, or the like may be used. The positive electrode mixture layer 32 may include, for example, the positive electrode active material, a binder, a conductive agent, and the like. The positive electrode 11 may be manufactured by, for example, applying a positive electrode mixture slurry including the positive electrode active material, the conductive agent, the binder, and the like on the positive electrode current collector 30, drying and then compressing the coating film to form the positive electrode mixture layer 32.

Examples of the positive electrode active material include a lithium-transition metal composite oxide containing a transition metal element such as Co, Mn, and Ni. Examples of the lithium-transition metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M represents at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These may be used singly, or as a mixture thereof. In terms of attempting a higher capacity of the non-aqueous electrolyte secondary battery, the positive electrode active material preferably includes a lithium-nickel composite oxide such as $Li_xNiO_2$, $Li_xCo_yNi_{1-y}O_2$, and $Li_xNi_{1-y}M_yO_z$ (M represents at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). Onto particle surfaces of the lithium-transition metal composite oxide, particles of an inorganic compound such as aluminum oxide and a lanthanoid-containing compound may adhere.

Examples of the conductive agent included in the positive electrode mixture layer 32 may include carbon materials such as carbon black (CB), acetylene black (AB), Ketjenblack, and graphite. The conductive agent may include fibrous carbon such as carbon nanotube (CNT), described later. These may be used singly, or in combination of two or more.

Examples of the binder included in the positive electrode mixture layer 32 may include fluororesins such as polytetrafluoroethylene (PTFE) and polyvinylidene fluoride (PVdF), polyacrylonitrile (PAN), polyimide (PI), acrylic resins, and polyolefin resins. These may be used singly, or in combination of two or more. With these resins, carboxymethylcellulose (CMC) or a salt thereof, polyethylene oxide (PEO), and the like may be used in combination.

[Negative Electrode]

The negative electrode 12 has a band-shaped negative electrode current collector and a negative electrode mixture layer formed on a surface of the negative electrode current collector. As illustrated in FIG. 1, the negative electrode 12 may have negative electrode mixture layers 36 on both the surfaces of a negative electrode current collector 34. As the negative electrode current collector 34, a foil of a metal stable within a potential range of the negative electrode 12, such as copper, a film in which such a metal is disposed on a surface layer, or the like may be used.

The negative electrode mixture layer 36 contains the negative electrode active material and fibrous carbon. The negative electrode active material is not particularly limited as long as it may reversibly occlude and release lithium ions, and a carbon material such as graphite may be used, for example. The graphite may be any of: a natural graphite such as flake graphite, massive graphite, and amorphous graphite; and an artificial graphite such as massive artificial graphite and graphitized mesophase-carbon microbead.

As the negative electrode active material, a metal that forms an alloy with Li, such as Si or Sn, a metal compound including Si, Sn, or the like, a lithium-titanium composite oxide, or the like may be used. For example, a Si oxide represented by $SiO_x$ ($0.5\leq x\leq1.6$), a Si-containing compound in which Si fine particles are dispersed in a lithium silicate phase represented by $Li_{2y}SiO_{(2+y)}$ ($0<y<2$), or the like may be used in combination with the carbon material such as graphite. Since the metallic material including Si, Sn, and the like has a larger change in volume with charge and discharge than the carbon material, using the above metallic material as the negative electrode active material is likely to cause ununiformed distribution of the electrolyte liquid in the negative electrode mixture layer 36. Thus, when the above metallic material is used as the negative electrode active material, the charge-discharge cycle characteristics are more remarkably improved by distributing the fibrous carbon in the negative electrode mixture layer 36 as described later.

The fibrous carbon included in the negative electrode mixture layer 36 functions as the conductive agent, and improves permeability of the electrolyte liquid, as described later. A content of the fibrous carbon included in the negative electrode mixture layer 36 may be greater than or equal to 0.1 mass % and less than or equal to 5 mass %, is preferably greater than or equal to 0.3 mass % and less than or equal to 3 mass %, and more preferably greater than or equal to 0.5 mass % and less than or equal to 1.5 mass %, relative to a mass of the negative electrode active material. The content within this range may improve the permeability of the electrolyte liquid in the negative electrode mixture layer 36 with achieving dispersibility in the negative electrode mixture slurry.

Examples of the fibrous carbon may include carbon nanotube (CNT), carbon nanohorn (CNH), carbon nanofiber (CNF), vapor-grown carbon fiber (VGCF), electrospun carbon fiber, polyacrylonitrile (PAN)-based carbon fiber, and pitch-based carbon fiber. These may be used singly, or in combination of two or more.

The fibrous carbon preferably includes CNT. The structure of CNT is not particularly limited, and may be any of: a tubular structure in which graphene sheets composed of six-membered carbon rings are wound parallel to a fiber axis; a platelet structure in which graphene sheets composed of six-membered carbon rings are arranged perpendicular to a fiber axis; and a herringbone structure in which graphene sheets composed of six-membered carbon rings are wound with oblique angle to a fiber axis. The layered structure of CNT is also not limited, and may be any of single wall carbon nanotube (SWCNT) and multiwall carbon nanotube (MWCNT). Since SWCNT may form a conductive path in the negative electrode mixture layer 36 at a smaller amount than MWCNT, CNT preferably includes SWCNT. The negative electrode mixture layer 36 may include not only SWCNT but also MWCNT.

An average fiber length of the fibrous carbon is preferably greater than or equal to 0.1 μm and less than or equal to 40 μm, more preferably greater than or equal to 0.3 μm and less than or equal to 20 μm, and particularly preferably greater than or equal to 0.5 μm and less than or equal to 5 μm. In the negative electrode mixture layer 36, the electrolyte liquid permeates through the fibrous carbon. Fibrous carbon having a larger average fiber length has higher permeability than fibrous carbon having a smaller average fiber length. In other words, the fibrous carbon having a smaller average fiber length has a higher retention of the electrolyte liquid than the fibrous carbon having a larger average fiber length. Here, the average fiber length of the fibrous carbon is calculated by measuring lengths of 10 fibrous carbons using a scanning electron microscope (hereinafter, which may be referred to as SEM) to average these values. For example, from a SEM image (number of pixels: 1024×1280) with magnification of 50 thousand times observed under a condition of an acceleration voltage of 5 kV, the length of the fibrous carbon may be determined. A diameter of the fibrous carbon may be, for example, greater than or equal to 1 nm and less than or equal to 100 nm. The diameter of the fibrous carbon is calculated by measuring thicknesses of 10 fibrous carbons using a SEM to average these values.

Figure 2:
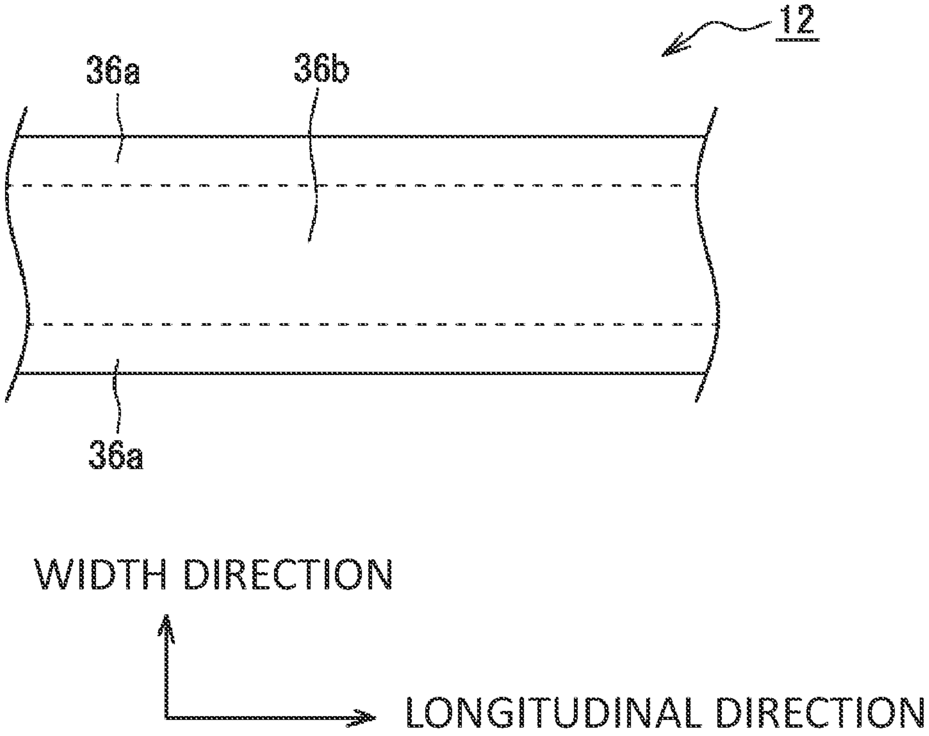
FIG. 2 is a front view of a negative electrode of an example of an embodiment.

Next, the distribution of the fibrous carbon in the negative electrode mixture layer 36 formed on the surface of the negative electrode current collector 34 will be described with reference to FIG. 2. FIG. 2 is a front view of the negative electrode 12 of an example of an embodiment. Both edge portions 36*a* are regions at both edges in a width direction of the negative electrode mixture layer 36 formed on both the surfaces of the band-shaped negative electrode current collector 34, and a middle portion 36*b* is a middle region in the width direction of the negative electrode mixture layer 36.

An average fiber length of the fibrous carbon contained in the middle portion 36*b* in the width direction of the negative electrode mixture layer 36 is larger than an average fiber length of the fibrous carbon contained in both the edge portions 36*a* in the width direction of the negative electrode mixture layer 36. This may improve the charge-discharge cycle characteristics. It is presumably because outflow of the electrolyte liquid from the middle portion 36*b* is inhibited during charge, and the electrolyte liquid is easily returned from an outside of the electrode assembly to the middle portion 36*b* via both the edge portions 36*a* during discharge.

In the width direction of the negative electrode mixture layer, an area ratio between both the edge portions 36*a* and the middle portion 36*b* is preferably within a range of greater than or equal to 30:70 and less than or equal to 70:30, and more preferably within a range of greater than or equal to 45:55 and less than or equal to 55:45. Setting the area ratio between both the edge portions 36*a* and the middle portion 36*b* within this range improves a balance of the electrolyte liquid in the electrode assembly during charge and discharge, and the charge-discharge cycle characteristics are more remarkably improved.

The lengths in the width direction of both the edge portions 36*a* are preferably substantially same from the viewpoint of uniformity of the distribution of the electrolyte liquid in the electrode assembly. A ratio of the lengths in the width direction between one edge portion 36*a*, the middle portion 36*b*, and the other edge portion 36*a* may be, for example, greater than or equal to 15:70:15 and less than or equal to 35:30:35.

A ratio of the average fiber length of the fibrous carbon contained in the middle portion 36*b* to the average fiber length of the fibrous carbon contained in both the edge portions 36*a* is preferably greater than or equal to 1.2. This may enlarge a difference in liquid permeability between both the edge portions 36*a* and the middle portion 36*b*, and thereby the electrolyte liquid may be held in the middle portion 36*b* where outflow electrolyte liquid from the electrode assembly during charge is less likely to be returned than both the edge portions 36*a*. The ratio of the average fiber length of the fibrous carbon contained in the middle portion 36*b* to the average fiber length of the fibrous carbon contained in both the edge portions 36*a* may be, for example, less than or equal to 5, or less than or equal to 3.

The average fiber length of the fibrous carbon contained in both the edge portions 36*a* is preferably greater than or equal to 1 μm, and more preferably greater than or equal to 2 μm. Within this range, the permeability of the electrolyte liquid in both the edge portions 36*a* may be improved.

The content of the fibrous carbon in both the edge portions 36*a* may be larger than, may be same as, or may be smaller than the content of the fibrous carbon in the middle portion 36*b*. The content of the fibrous carbon in both the edge portions 36*a* is preferably substantially same as the content of the fibrous carbon in the middle portion 36*b*. Here, the content of the fibrous carbon in both the edge portions 36*a* and the content of the fibrous carbon in the middle portion 36*b* refer to a percentage of a mass of the fibrous carbon relative to a mass of the negative electrode active material in both the edge portions 36*a* and the middle portion 36*b*, respectively.

The negative electrode mixture layer 36 may contain non-fibrous carbon in addition to the fibrous carbon. Examples of the non-fibrous carbon may include carbon materials such as carbon black (CB), acetylene black (AB), Ketjenblack, and graphite. These may be used singly, or in combination of two or more. A content of the non-fibrous carbon conductive agent in the negative electrode mixture layer 36 may be, for example, less than or equal to 5 mass % relative to a total mass of the negative electrode mixture layer 36.

The negative electrode mixture layer 36 may further include a binder or the like. As the binder included in the negative electrode mixture layer 36, a fluororesin such as PTFE or PVdF, PAN, PI, an acrylic resin, a polyolefin resin, or the like may be used as in the case of the positive electrode 11, but styrene-butadiene rubber (SBR) is preferably used. The negative electrode mixture layer may include CMC or a salt thereof, polyacrylic acid (PAA) or a salt thereof, polyvinyl alcohol (PVA), or the like.

The above negative electrode 12 may be manufactured with the following steps 1 to 3, for example.

(1) The negative electrode active material, the binder, a thickener, and the like are mixed with a first fibrous carbon at an appropriate ratio to prepare a negative electrode mixture slurry A with water as a dispersion medium.

(2) The negative electrode active material, the binder, the thickener, and the like are mixed with a second fibrous carbon, which has a shorter average fiber length than the first fibrous carbon, at an appropriate ratio to prepare a negative electrode mixture slurry B with water as a dispersion medium.

(3) On the surface of the negative electrode current collector 34, the negative electrode mixture slurry A is applied to the middle portion, and the coating is dried. Then, the negative electrode mixture slurry B is applied to the edge portions, and the coating is dried and compressed to form the negative electrode mixture layer 36 having both the edge portions 36*a* and the middle portion 36*b*. This may manufacture the negative electrode 12. Note that, after the negative electrode mixture slurry A is applied, the coating may not be dried, and after the negative electrode mixture slurry B is applied, the coating may be dried and compressed to form the negative electrode mixture layer 36. Alternatively, the negative electrode mixture slurry B may be applied to the edge portions and then the negative electrode mixture slurry A may be applied to the middle portion.

[Separator]

As the separator 13, a porous sheet having an ion permeation property and an insulation property may be used. Specific examples of the porous sheet include a fine porous thin film, a woven fabric, and a nonwoven fabric. As a material for the separator 13, a polyolefin such as polyethylene or polypropylene, cellulose, or the like is preferable. The separator 13 may have any of a single-layered structure and a multi-layered structure. On a surface of the separator 13, a heat-resistant layer and the like may be formed.

[Electrolyte Liquid]

The electrolyte liquid (non-aqueous electrolyte) may include a non-aqueous solvent and an electrolyte salt dissolved in the non-aqueous solvent. As the non-aqueous solvent, any of esters, ethers, nitriles such as acetonitrile, and amides such as dimethylformamide, a mixed solvent of two or more thereof, or the like may be used, for example. The non-aqueous solvent may contain a halogen-substituted derivative in which hydrogen of these solvents is at least partially replaced with a halogen atom such as fluorine. Examples of the halogen-substituted derivative include fluorinated cyclic carbonates such as fluoroethylene carbonate (FEC), fluorinated chain carbonates, and fluorinated chain carboxylates such as methyl fluoropropionate (FMP).

Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL); and chain carboxylates such as methyl acetate, ethyl acetate, propyl acetate, methyl propionate (MP), and ethyl propionate.

Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ ($1<x<6$, and n represents 1 or 2), $LiB_{10}Cl_{10}$, LiCl, LiBr, LiI, lithium chloroborane, a lithium lower aliphatic carboxylate, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {l and m represent integers of 0 or more}. These lithium salts may be used singly, or as a mixture thereof. Among them, $LiPF_6$ is preferably used from the viewpoints of ion conductivity, electrochemical stability, and the like. A concentration of the lithium salt may be, for example, greater than or equal to 0.8 mol and less than or equal to 1.8 mol per litter of the non-aqueous solvent.

EXAMPLES

Hereinafter, the present disclosure will be further described with Examples, but the present disclosure is not limited to these Examples.

Example

[Production of Positive Electrode]

As a positive electrode active material, lithium nickelate containing cobalt and aluminum and represented by $LiNi_{0.8}Co_{0.15}Al_{0.05}O_2$ was used. This positive electrode active material, acetylene black (AB), and polyvinylidene fluoride (PVdF) were mixed at a mass ratio of 94:5:1 to prepare a positive electrode mixture slurry with N-methyl-2-pyrrolidone (NMP) as a dispersion medium. This positive electrode mixture slurry was applied on both surfaces of a band-shaped positive electrode current collector made of aluminum foil by a doctor blade method, the coating was dried, and then the coating was compressed with a roller to form a positive electrode mixture layer on both the surfaces of the positive electrode current collector. The positive electrode current collector in which the positive electrode mixture layers were formed was cut to a predetermined electrode size to produce a positive electrode.

[Production of Negative Electrode]

A mixture of a graphite powder and Si oxide at a mass ratio of 95:5 was used as a negative electrode active material. The negative electrode active material, carboxymethylcellulose (CMC), carbon nanotube (CNT) having an average fiber length of 2.4 μm, and styrene-butadiene rubber (SBR) were mixed at a mass ratio of 100:0.8:1:1.2 to prepare a negative electrode mixture slurry A with water as a dispersion medium.

The above negative electrode active material, CMC, CNT having an average fiber length of 2 μm, and SBR were mixed at a mass ratio of 100:0.8:1:1.2 to prepare a negative electrode mixture slurry B with water as a dispersion medium.

A negative electrode current collector made of copper foil was prepared, and portions thereof at a length ratio in the width direction of 25:50:25 were specified as an edge portion, a middle portion, and an edge portion. That is, an area ratio between both the edge portions and the middle portion was 50:50. On the middle portion of both surfaces of the negative electrode current collector, the negative electrode mixture slurry A was applied by a doctor blade method, the coating was dried, then the negative electrode mixture slurry B was applied by a doctor blade method on both the edge portions, and the coating was dried and compressed with a roller to form negative electrode mixture layers on both the surfaces of the negative electrode current collector. The negative electrode current collector in which the negative electrode mixture layers were formed was cut to a predetermined electrode size to produce a negative electrode.

[Preparation of Electrolyte Liquid]

Into a mixed solvent in which ethylene carbonate (EC), ethyl methyl carbonate (EMC), and dimethyl carbonate (DMC) were mixed at a volume ratio of 3:3:4 (at 25° C., 1 atm), $LiPF_6$ was dissolved at a concentration of 1.2 mol/L to prepare an electrolyte liquid.

[Production of Secondary Battery]

An aluminum lead was attached to the positive electrode, and a nickel lead was attached to the negative electrode. The positive electrode and the negative electrode were spirally wound with a separator made of polyethylene fine porous film interposed therebetween to produce a wound electrode assembly. This electrode assembly was housed in an exterior, and the nickel lead was welded to a bottom of the exterior. Then, the aluminum lead was welded to a sealing assembly, the above electrolyte liquid was injected thereinto, and then an opening of the exterior was sealed with the sealing assembly to obtain a non-aqueous electrolyte secondary battery having a designed capacity of 2500 mAh.

Example 2

A secondary battery was produced in the same manner as in Example 1 except that, in the production of the negative electrode, the area ratio between both the edge portions and the middle portion was changed to 70:30 (portions in the width direction at a length ratio of 35:30:35 were specified as the edge portion, the middle portion, and the edge portion).

Example 3

A secondary battery was produced in the same manner as in Example 1 except that, in the production of the negative electrode, the area ratio between both the edge portions and the middle portion was changed to 55:45 (portions in the width direction at a length ratio of 27.5:45:27.5 were specified as the edge portion, the middle portion, and the edge portion).

Example 4

A secondary battery was produced in the same manner as in Example 1 except that, in the production of the negative electrode, the area ratio between both the edge portions and the middle portion was changed to 90:10 (portions in the width direction at a length ratio of 45:10:45 were specified as the edge portion, the middle portion, and the edge portion).

Example 5

A secondary battery was produced in the same manner as in Example 1 except that, in the production of the negative electrode, the area ratio between both the edge portions and the middle portion was changed to 30:70 (portions in the width direction at a length ratio of 15:70:15 were specified as the edge portion, the middle portion, and the edge portion).

Example 6

A secondary battery was produced in the same manner as in Example 1 except that, in the production of the negative electrode, the area ratio between both the edge portions and the middle portion was changed to 45:55 (portions in the width direction at a length ratio of 22.5:55:22.5 were specified as the edge portion, the middle portion, and the edge portion).

Example 7

A secondary battery was produced in the same manner as in Example 1 except that, in the production of the negative electrode, the area ratio between both the edge portions and the middle portion was changed to 10:90 (portions in the width direction at a length ratio of 5:90:5 were specified as the edge portion, the middle portion, and the edge portion).

Example 8

A secondary battery was produced in the same manner as in Example 1 except that, in the production of the negative electrode, the average fiber length of CNT contained in the negative electrode mixture slurry A was changed to 1.2 μm; and the average fiber length of CNT contained in the negative electrode mixture slurry B was changed to 1.0 μm.

Comparative Example 1

A secondary battery was produced in the same manner as in Example 1 except that, in the production of the negative electrode, the average fiber length of CNT contained in the negative electrode mixture slurry A was changed to 2.0 μm.

Comparative Example 2

A secondary battery was produced in the same manner as in Example 1 except that, in the production of the negative electrode, the average fiber length of CNT contained in the negative electrode mixture slurry A was changed to 2.0 μm; and the average fiber length of CNT contained in the negative electrode mixture slurry B was changed to 2.4 μm.

[Cycle Test]

Under a temperature environment at 25° C., each of the secondary batteries was charged at a constant current of 0.7 C until a battery voltage reached 4.2 V, and charged at a constant voltage of 4.2 V until a current value reached 1/20 C. Thereafter, the secondary battery was discharged at a constant current of 0.7 C until the battery voltage reached 2.75 V. This charge-discharge cycle was repeated with 400 cycles. A discharge capacity at the 1st cycle and a discharge capacity at the 400th cycle were determined, and a capacity retention was calculated by the following formula.

Capacity Retention (%)=(Discharge Capacity at 400th Cycle/Discharge Capacity at 1st Cycle)×100

Table 1 shows the evaluation results of each secondary battery. Table 1 also shows: the average fiber length of CNT included in each of the edge portions and middle portion of the negative electrode; and the area ratio between the edge portions and middle portion of the negative electrode.

TABLE 1

| | Average fiber length of fibrous carbon (CNT) [μm] | | Area ratio (both edge portions:middle portion) | Capacity retention [%] |
|---|---|---|---|---|
| | Both edge portions | Middle portion | | |
| Example 1 | 2 | 2.4 | 50:50 | 78 |
| Example 2 | 2 | 2.4 | 70:30 | 73 |
| Example 3 | 2 | 2.4 | 55:45 | 77 |
| Example 4 | 2 | 2.4 | 90:10 | 70 |
| Example 5 | 2 | 2.4 | 30:70 | 72 |
| Example 6 | 2 | 2.4 | 45:55 | 77 |
| Example 7 | 2 | 2.4 | 10:90 | 71 |
| Example 8 | 1 | 1.2 | 50:50 | 73 |
| Comparative Example 1 | 2 | 2 | 50:50 | 59 |
| Comparative Example 2 | 2 | 2.4 | 50:50 | 57 |

As shown in Table 1, the batteries of Examples have excellent charge-discharge cycle characteristics compared with the batteries of Comparative Examples. The battery of Comparative Example 1 contains CNT having the same average fiber length in both the edge portions and the middle portion in the width direction of the negative electrode mixture layer. Accordingly, the electrolyte liquid is more likely to decrease in the middle portion than in both the edge portions, and the distribution of the electrolyte liquid becomes ununiform during both of charge and discharge, and therefore the charge-discharge cycle characteristics are deteriorated. Meanwhile, all of the batteries of Examples 1 to 8 contain CNT having a larger average fiber length in the middle portion than CNT contained in both the edge portions. This enables the electrolyte liquid to be retained in the middle portion of the negative electrode mixture layer in all of the batteries of Examples 1 to 8 to inhibit ununiformity of the electrolyte in the electrode assembly. This is presumably a reason of the improvement of the charge-discharge cycle characteristics. Particularly, Example 1, which has the area ratio between both the edge portions and the middle portion of 50:50, most improves the charge-discharge cycle characteristics. Comparative Example 2, which contains CNT having a larger average fiber length in both the edge portions than CNT contained in the middle portion, is likely to cause the ununiformed electrolyte liquid in the electrode assembly, and has the deteriorated charge-discharge cycle characteristics compared with Comparative Example 1.

REFERENCE SIGNS LIST

10 secondary battery, 11 positive electrode, 12 negative electrode, 13 separator, 14 electrode assembly, 15 exterior, 16 sealing assembly, 17, 18 insulating plate, 19 positive electrode lead, 20 negative electrode lead, 21 grooved portion, 22 filter, 23 lower vent member, 24 insulating member, 25 upper vent member, 26 cap, 26*a* opening, 27 gasket, 30 positive electrode current collector, 32 positive electrode mixture layer, 34 negative electrode current collector, 36 negative electrode mixture layer, 36*a* edge portion, 36*b* middle portion

The invention claimed is:

1. A non-aqueous electrolyte secondary battery, comprising:

an electrode assembly in which a band-shaped positive electrode and a band-shaped negative electrode are wound with a separator interposed therebetween;

an electrolyte liquid; and an exterior housing the electrode assembly and the electrolyte liquid, wherein the negative electrode has a negative electrode current collector and a negative electrode mixture layer formed on a surface of the negative electrode current collector, the negative electrode mixture layer contains a negative electrode active material and fibrous carbon, an average fiber length of the fibrous carbon contained in a middle portion of the negative electrode mixture layer is larger than an average fiber length of the fibrous carbon contained in both edge portions in a width direction of the negative electrode mixture layer, and a ratio of an average fiber length of the fibrous carbon contained in the middle portion to an average fiber length of the fibrous carbon contained in both the edge portions is greater than or equal to 1.2.

2. The non-aqueous electrolyte secondary battery according to claim 1, wherein in the width direction of the negative electrode mixture layer, an area ratio between both the edge portions and the middle portion is within a range of greater than or equal to 30:70 and less than or equal to 70:30.

3. The non-aqueous electrolyte secondary battery according to claim 1, wherein in the width direction of the negative electrode mixture layer, an area ratio between both the edge portions and the middle portion is within a range of greater than or equal to 45:55 and less than or equal to 55:45.

4. The non-aqueous electrolyte secondary battery according to claim 1, wherein the average fiber length of the fibrous carbon contained in both the edge portions is greater than or equal to 1 μm.

5. The non-aqueous electrolyte secondary battery according to claim 1, wherein the fibrous carbon includes carbon nanotubes.

* * * * *